(No Model.)
J. DELLAR.
STANDING PLATFORM FOR BATH ROOMS.
No. 510,869. Patented Dec. 12, 1893.
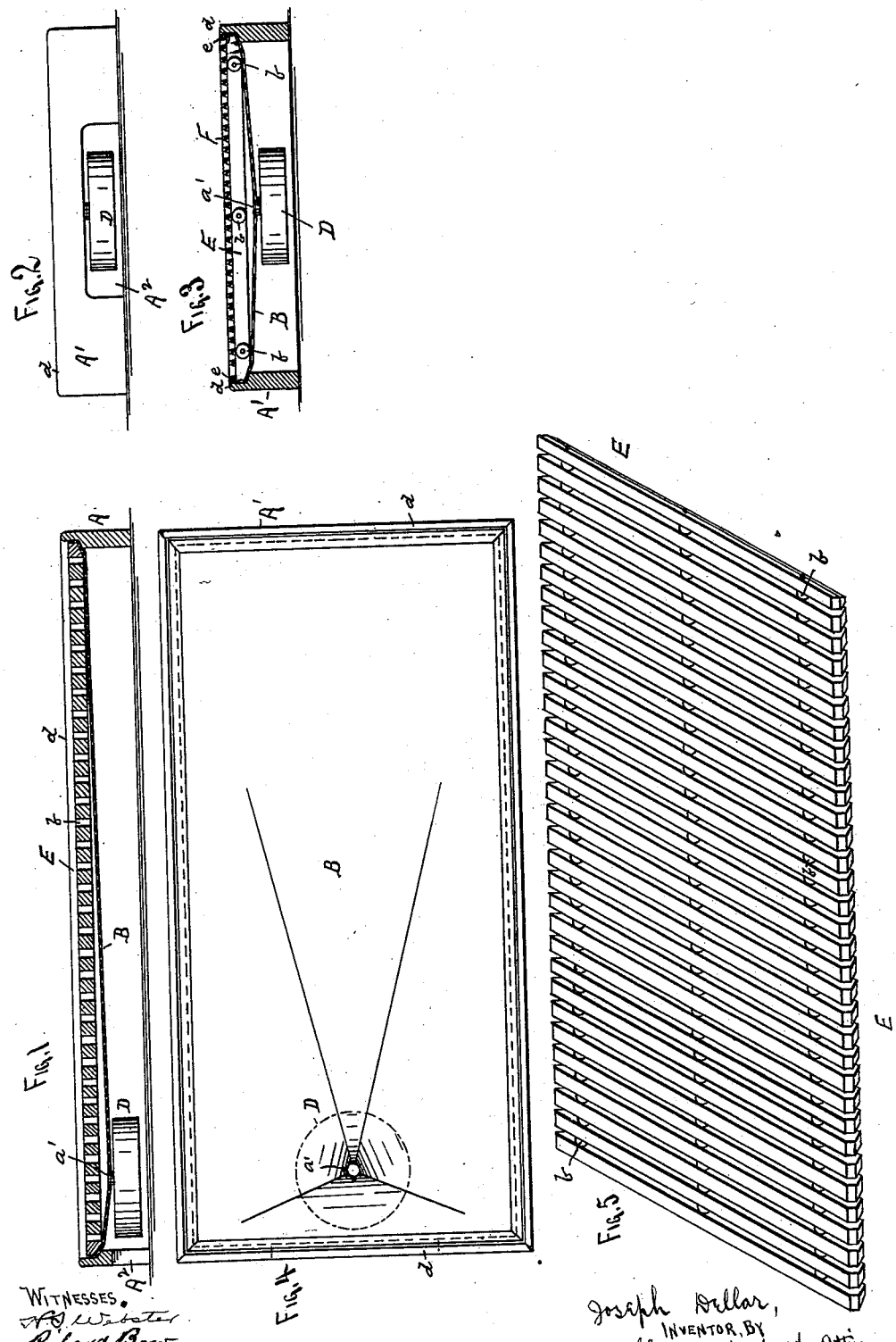

UNITED STATES PATENT OFFICE.

JOSEPH DELLAR, OF ST. PAUL, MINNESOTA.

STANDING PLATFORM FOR BATH-ROOMS.

SPECIFICATION forming part of Letters Patent No. 510,869, dated December 12, 1893.

Application filed March 18, 1893. Serial No. 466,571. (No model.)

*To all whom it may concern:*

Be it known that I, JOSEPH DELLAR, a citizen of the United States, residing at St. Paul, in the county of Ramsey and State of Minnesota, have invented certain new and useful Improvements in Standing Platforms for Bath-Rooms, of which the following is a specification.

This invention relates to bath rooms, and consists in the manner of constructing and arranging the platform on which the bather steps when first leaving the bath tub, as hereinafter shown and described, and specifically pointed out in the claims.

In the drawings,—Figure 1 is a longitudinal sectional elevation. Fig. 2 is an end view. Fig. 3 is a cross sectional view. Fig. 4 is a plan view, with the grating removed. Fig. 5 is a perspective view of the grating detached.

A' is the base frame adapted to support a drip pan B the latter arranged to incline from all points to an outlet opening $a'$, as shown. Beneath this outlet $a'$ is secured, (preferably by a screw joint,) a receptacle D into which the drippings from the pan run.

E is a grating formed of parallel slats secured together in any suitable manner, but preferably by circular chocks $b$, between the slats, and with bolts passing through the slats and chocks, and which rests in the frame A' above the drip pan B. The edges of the pan B are beveled and fit into correspondingly beveled recesses in the upper edges of the base frame, as shown, and the ends of the slats of the grating are likewise beveled to fit them, so that the inclination of the pan is extended out to the extreme edge of the base frame, to insure the catching of all the drippings which may fall between the slats, and prevent any leakage between the slats and base frame. The base frame is shown with an opening $A^2$ at one end through which the receptacle D may be reached, to remove it and replace it when it is to be emptied.

While I prefer to arrange the receptacle so that it may be screwed upon the drip pan B, any other easily removable fastening may be employed, if desired. A screw fastening has the advantage of being capable of being made water tight, so that when the receptacle is in place, if the apparatus be moved the water will not be liable to run out.

The rim $d$ of the base frame A' is formed to project for a short distance above the upper surfaces of the slats, so that the water will not flow over the edge of the base frame.

An open work rubber, or other flexible mat F will be placed over the slats, this mat being shown in section in Fig. 3. The rim $e$ of the mat will be formed to project somewhat, so as to afford a stop to the water and prevent its running over the edge of the base frame.

Having thus described my invention, what I claim as new is—

1. A bath room standing platform consisting of a base frame A' having the inclined drip pan B, water receptacle D adapted to be attached removably to said drip pan to receive the drippings therefrom, and a grating resting within said frame above said drip pan, substantially as and for the purpose set forth.

2. In a bath room standing platform, a base frame having beveled recess around its edge, an inclined drip pan having its rim inclined to correspond to and adapted to rest within said beveled recess, a grating resting upon said beveled rim within said recess, and a receptacle adapted to be attached removably to said drip pan to receive the water therefrom, substantially as and for the purpose set forth.

3. A bath room standing platform, consisting of a base frame A' having the inclined drip pan B, water receptacle D adapted to be attached removably to said drip pan to receive the drippings therefrom, a grating resting within said frame above said drip pan, and an open work rubber or other flexible mat having a raised rim $e$ and resting upon said grating, substantially as and for the purpose set forth.

In testimony whereof I have hereunto set my hand in the presence of two subscribing witnesses.

JOSEPH DELLAR.

Witnesses:
C. N. WOODWARD,
H. S. WEBSTER.